(No Model.)

J. T. BRAYTON.
GAGE FOR LENSES.

No. 548,290. Patented Oct. 22, 1895.

Witnesses:
Elsie Nemett.

Inventor:
James T. Brayton
by Raymond & Veeder
Attys

ANDREW B.GRAHAM, PHOTO-LITHO. WASHINGTON, D.C.

UNITED STATES PATENT OFFICE.

JAMES T. BRAYTON, OF CHICAGO, ILLINOIS, ASSIGNOR TO THE GENEVA OPTICAL COMPANY, OF ILLINOIS.

GAGE FOR LENSES.

SPECIFICATION forming part of Letters Patent No. 548,290, dated October 22, 1895.

Application filed June 17, 1891. Serial No. 396,585. (No model.)

*To all whom it may concern:*

Be it known that I, JAMES T. BRAYTON, of Chicago, in the county of Cook and State of Illinois, have invented certain new and useful Improvements in Gages for Determining the Curvature of Lenses, of which the following is a specification.

My invention relates to devices similar in general structure and mode of operation to that shown in my Patent No. 447,276, issued February 24, 1891.

The object of my invention is to provide a device which shall be specially sensitive and accurate. I accomplish this by using two trains of indicating mechanism acting in opposite directions, so that the indicating-scale can be made large and a sufficient multiplication of the movement of the indicating-points can be secured by simple gearing.

In carrying out my invention I employ a series of contact-points, none of which are necessarily fixed, but which are so connected to the indicating mechanism that their relative positions as determined by the curve of the object placed against them are accurately indicated thereby.

Figure 1:
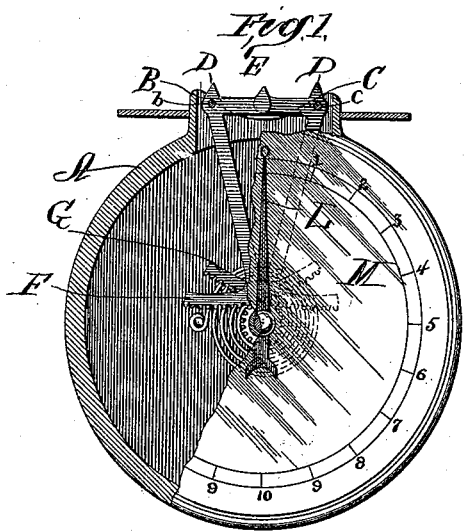
Figure 2:
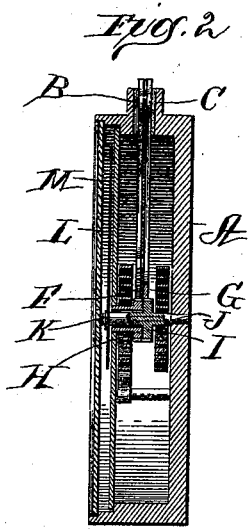

In the accompanying drawings, Figure 1 is a front view of an instrument embodying my invention, a portion of the dial being broken away to show the interior mechanism. Fig. 2 is a transverse section of the device. Figs. 3 to 7, inclusive, show modifications in the relative positions of the contact-points to each other and to the pivotal points of the lever upon which they are formed, the operation being essentially the same in all cases.

A, Figs. 1 and 2, is the case of the device, having a slot at one edge, through which projects the arms of two levers B C, pivoted within the case at $b$ $c$. Each lever B C has a pair of contact-points D E, the contact-point E of each lever formed on the overlapping ends of the levers B C, so that said contact-points coincide, as shown in the side elevation of Fig. 1. Upon the inner end of the levers B C are formed toothed sectors F G, which gear into pinions H I, respectively. The pinion I revolves on a stud J and has attached to it a sleeve K, which carries the pointer L. The pinion H revolves on the sleeve K and is connected to the dial M. By the connection just described the movement of the contact-points is indicated by the opposite movements of the pointer L and the dial M. An equal range of movement is thus secured by pinions of twice as great diameter as would be necessary if only the dial or the pointer were moved, and errors due to inaccuracies in the gearing would therefore be reduced one-half.

Figure 3:
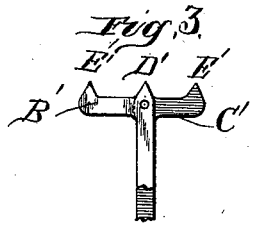
Figure 4:
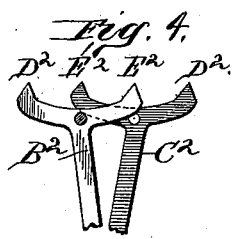

In Fig. 3 both levers B' C' are pivoted in the center, their arms extending outward. Their operation is practically identical with that of the levers B C shown in Figs. 1 and 2. In Fig. 4 the inner contact-points $E^2$ $E^2$ do not coincide as in Figs. 1 and 3, the lever-arms overlapping sufficiently to bring the contact-point $E^2$ of one lever between the contact-points $D^2$ $E^2$ of the other lever, and the pivotal points of the levers are between the contact-points instead of under one of them, as in the preceding figures.

Figure 5:
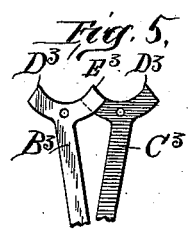

In Fig. 5 the levers $B^3$ $C^3$ are essentially of the same shape as in Fig. 4; but the inner contact-points $E^3$ coincide, as do the contact-points E in Fig. 1.

Figure 6:
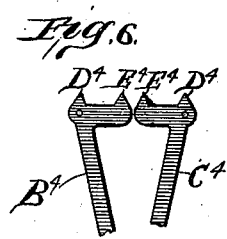
Figure 7:
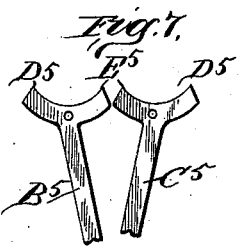

In Fig. 6 the middle contact-points $E^4$ are shown as slightly separated. The levers are otherwise like those shown in Fig. 1. In a similar manner the middle contact-points $E^5$ are somewhat separated. The levers are otherwise of the same general shape as those shown in Figs. 4 and 5.

In all of the shapes of levers and arrangement of the contact-points herein described the general principle and mode of operation is the same, there being in every instance two sets of contact-points, one or more of each set of contact-points being movable by the object placed thereon, and one set being connected to indicating mechanism which effects the movement of the dial and the other to indicating mechanism which effects the movement of the pointer.

The use of two levers, as illustrated, not only permits the use of two sets of indicating mechanism, but also independently of the use of such two sets of indicating mechanism conduces to the accuracy of the measurements by reason of the fact that the contact-points are always presented to the surface to be measured in substantially the same relation whatever the curvature of the lens. The use of double levers further conduces to accuracy by causing the outer contact-points to approach each other as the convexity of the surface to be measured is increased, and this tends to compensate for the irregularity of action of the device, which in the absence of such compensation would necessitate a scale having unequal spaces. The divisions on such a scale must be farther apart as the convexity of the object measured increases unless some such compensation as is afforded by the movable points of the double levers is provided.

I claim—

1. The combination in a lens measuring instrument of two sets of contact points arranged to simultaneously engage with the surface to be measured, whose relative positions are indicated by mechanism connected to the dial and to the pointer respectively, substantially as described.

2. The combination in a lens measuring instrument of two sets of contact points connected respectively to two trains of indicating mechanism working in opposite directions, substantially as described.

3. The combination in a lens measuring instrument of two levers each having one or more movable contact points and each lever operating indicating mechanism connected to the dial and to the pointer respectively, substantially as described.

4. The combination in a lens measuring instrument of two levers each having a set of contact points, through one of which movement may be imparted to the levers by an object placed thereon, and a train of indicating mechanism connected to each lever and to the dial and the pointer respectively, substantially as described.

5. The combination in a lens measuring instrument of two levers each having a set of contact points, through one of which movement may be imparted to the levers by an object placed thereon, and a train of indicating mechanism connected to each lever and to the dial and the pointer respectively and adapted to move the same in opposite directions, substantially as described.

6. In an instrument for determining curvatures, the combination with two indicators arranged to move in opposite directions and to coact in producing the proper indication or reading, of mechanism for moving said indicators, consisting of two or more movable points against which the article to be measured is brought, and intermediate connecting mechanism connecting said points with their respective indicators, whereby the movement of the points operates to move the indicators, substantially as described.

7. In an instrument for determining curvatures, the combination with two indicators arranged to move in opposite directions and to coact in producing the proper indication or reading, of mechanism for moving said indicators consisting of two levers, each lever having points of contact against which the article to be measured is brought, and intermediate connecting mechanism between the levers and their respective indicators, whereby the movement of the lever points will operate the indicators, substantially as described.

8. In an instrument for determining curvatures, the combination with two indicators arranged to move in opposite directions and to coact in producing the proper indication or reading, of mechanism for moving said indicators, consisting of two levers, each having points of contact against which the surface to be measured is brought, and pinions to which the respective indicators are connected, which mesh with segments on the respective levers, whereby the movement of the lever points operates the levers and through them the pinions and indicators, substantially as described.

9. In an instrument for determining curvatures, the combination of two levers, each provided with points of contact against which the surface to be measured is brought, and each provided on its opposite end with a segment which meshes with a corresponding pinion, a dial connected with one of the pinions, and a pointer connected with the other, whereby the movement of the lever points moves the pointer in one direction and the dial in the opposite direction, substantially as described.

JAMES T. BRAYTON.

Witnesses:
 ELSIE NEMETT,
 TODD MASON.